March 22, 1932.   J. J. BOLAND   1,850,528
LUBRICATING SYSTEM
Filed Jan. 24, 1931   2 Sheets-Sheet 1
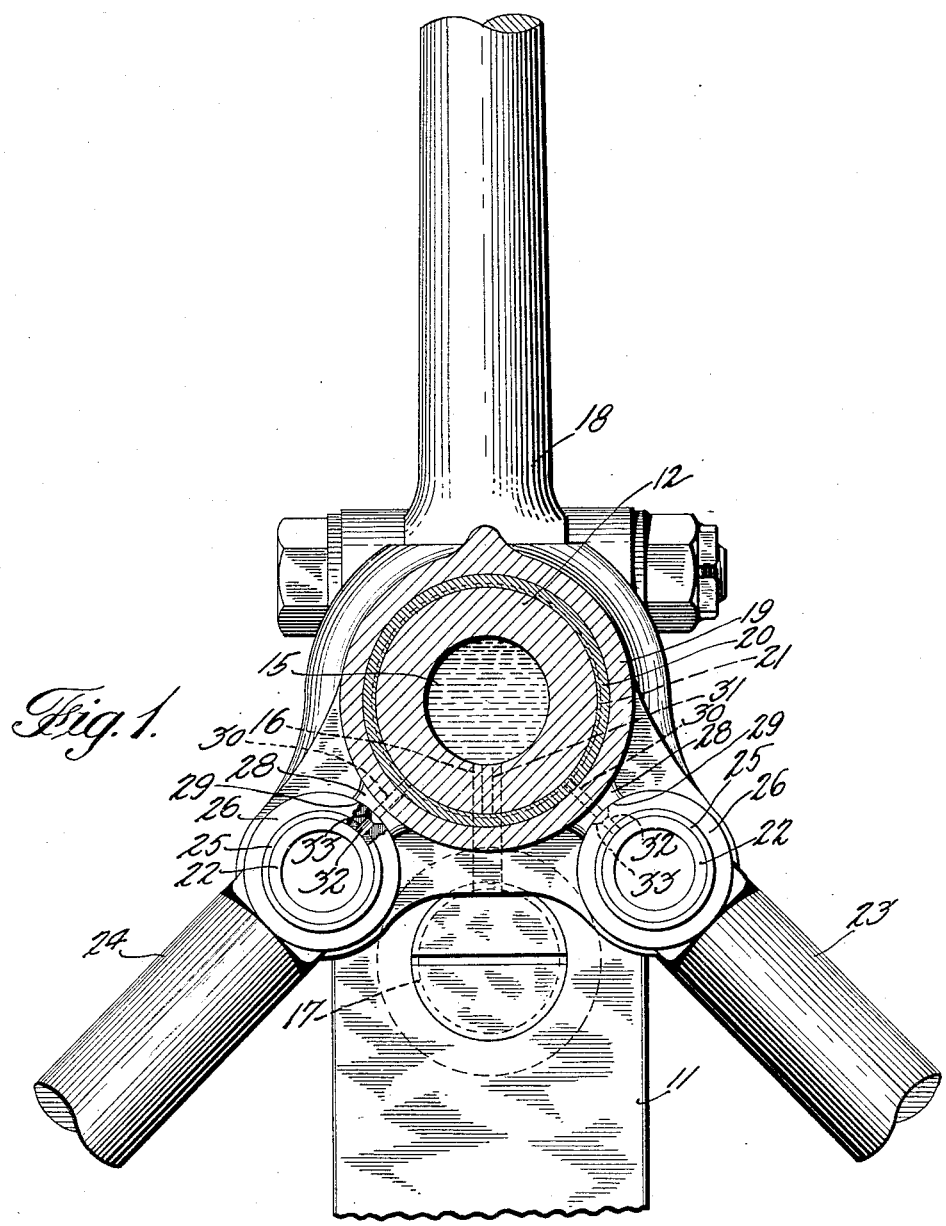
INVENTOR.
JOSEPH J. BOLAND
BY
ATTORNEY.

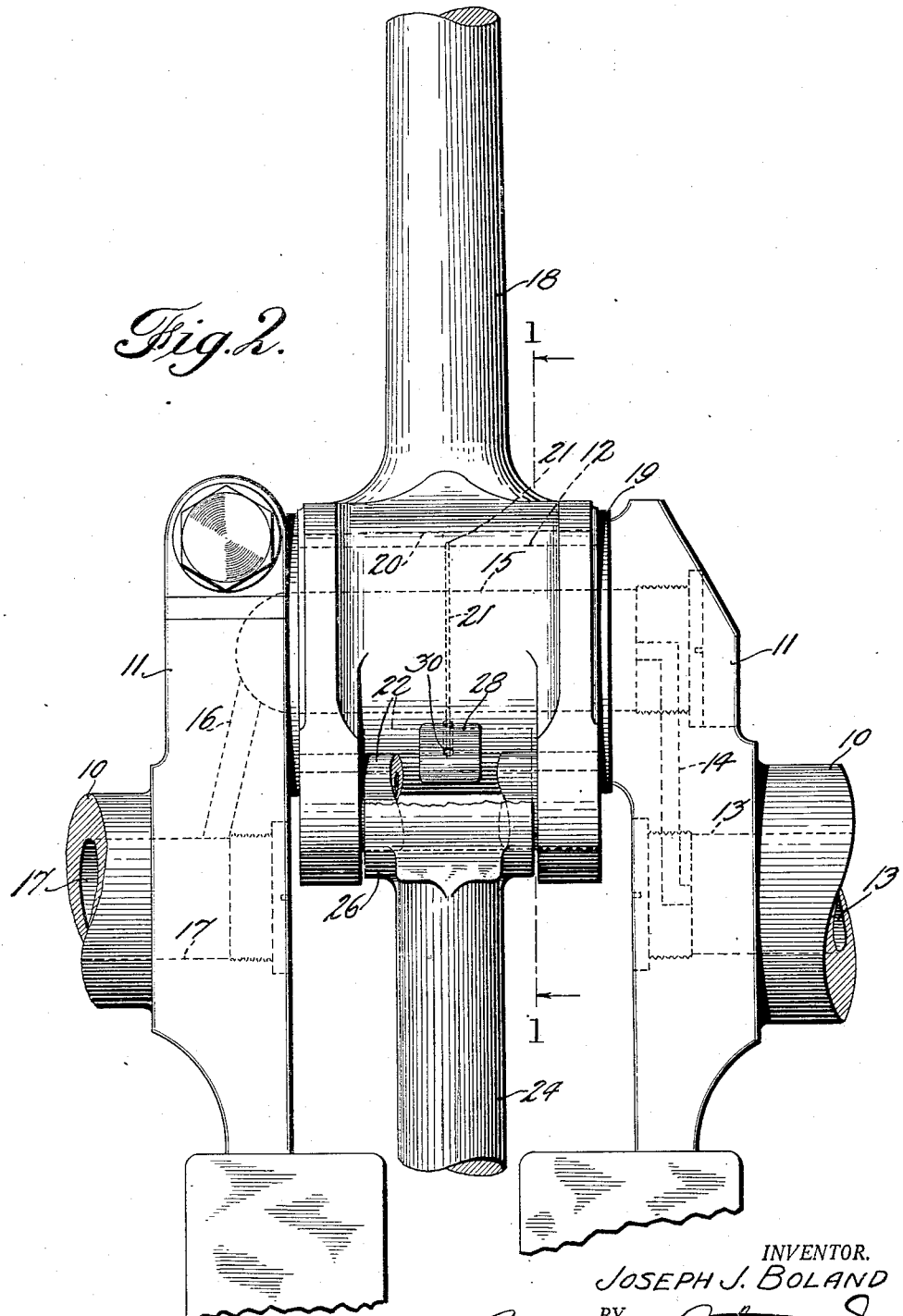

Patented Mar. 22, 1932

1,850,528

UNITED STATES PATENT OFFICE

JOSEPH J. BOLAND, OF KEYPORT, NEW JERSEY, ASSIGNOR TO AEROMARINE PLANE & MOTOR COMPANY, INC., A CORPORATION OF NEW YORK

LUBRICATING SYSTEM

Application filed January 24, 1931. Serial No. 510,927.

This invention relates to lubricating devices and more particularly to a device adapted for the lubrication of connecting rod bearings from a source of supply such as the crankshaft through which a fluid is usually circulated by a means such as a pump.

An object of the invention is to effectively lubricate the connecting rod bearings of a radial engine which comprise those of a master rod and a plurality of auxiliary rods that are articulated to the master rod.

In the past it has been found extremely difficult to supply constant and efficient lubrication to the bearings of the auxiliary connecting rods although the main or master rod was adequately provided at all times with the lubrication fluid. This was due to the fact that in radial engines the master rod is directly connected to the crank-pin of the drive-shaft through which the fluid is circulated, whilst the auxiliary rods have no direct connection therewith since they are articulated to the master-rod for oscillating movement relatively thereto.

In the present invention I have provided simple and highly efficient means for lubricating the bearings of these auxiliary rods in addition to those of the master-rod said means comprising passages for the fluid from the master-rod to the articulated rods and an effective seal between the moving parts to prevent leakage of the fluid.

Various other objects and advantages of the invention will be in part obvious from an inspection of the accompanying drawings and a careful consideration of the following particular description and claims of one form of the invention as herein disclosed.

In the drawings:

Figure 1 is a cross section of a crankshaft taken on the line 1—1 of Fig. 2 showing the present invention in its preferred form.

Figure 2 is a side elevation of the crank portion of a conventional crankshaft having a series of connecting rods common to radial engines connected thereto.

With reference to the drawings, 10 designates a hollow drive shaft adapted for the circulation of a lubricating fluid, and 11 the crank-throw which includes a crank-pin 12. Passages 13, 14, 15, 16 and 17 are provided so that the fluid may be conducted around the crank-throw 11 to the crank-pin 12 which is conventional practice.

On this crank-pin 12 there is rotatably mounted a master-rod 18 having a barrel shaped bearing portion 19 which is provided with an inner bearing element 20 preferably formed of anti-friction metal which has an annular groove 21 cut around its inner circumference to facilitate the flow of the lubricant. Articulated to this master-rod 18 by means of the hollow pins 22 are a plurality of radially extended auxiliary rods 23, 24 which also have a bearing element 25 drive fitted into the cylindrical member 26 of the rods.

On the exterior of the barrel portion 19 I have formed or secured in any suitable manner and in axial alignment with each of the auxiliary rods a radially extended pad 28 preferably constructed of antifriction metal. These pads are each provided with a concaved face 29 of the same radius as the outer circumference of the cylindrical members 26 with which they are adapted to lightly contact. Passages 30 have been formed to extend through the pads 28, the barrel 19 and bearing element 20 so as to communicate with the groove 21, and one or more passages 31 have been provided to conduct the fluid from the passage 15 to said groove. Passages 32 have also been formed to extend through the cylindrical members 26 and the bearing portion 25 in a manner as to register with the passages 30. The outer openings of the passages 32 have been widened as to 33 so that the flow of the lubricant may not be interrupted during the operation of the engine and it might be mentioned in passing, that the angular movement of the auxiliary rods during operation is not sufficiently great to bring the connecting passages out of register with one another provided that one or the other of said passages has been slightly enlarged in the manner shown and described.

It is manifest that with the construction herein disclosed that there will be a constant flow of lubricant from the passage 15 to the bearings of both the master-rod and the auxiliary connecting rods particularly when such lubricant is circulated under considerable pressure.

Variations may be resorted to within the scope of the invention and portions of the improvements may be used without the others, whilst not departing from the spirit of the invention.

Having thus described my invention, I claim:

1. In apparatus of the class described, the combination with a crankshaft having a crankpin provided with passages therethrough for the circulation of a lubricant to its outer circumference, of a master-rod having a cylindrical bearing portion surrounding the crankpin, a plurality of auxiliary rods, articulated to said master-rod by means of bearings and adapted for oscillation relatively thereto; said cylindrical bearing portion of the master-rod and the bearings of the auxiliary rods each being provided with mutually communicating passages for the conduction of a lubricant from said crankpin to all of said bearings; the passages of the auxiliary rod bearings being relatively movable to those of the master-rod, and means adapted to maintain effective communcation between said passages during such relative movement.

2. In apparatus of the class described, the combination with a crankshaft having a hollow crankpin with a lateral passage therethrough for the circulation of a lubricant to its outer circumference, of a master-rod having a cylindrical bearing portion surrounding said crankpin, a plurality of auxiliary rods articulated to said master-rod by means of bearings and adapted for oscillation relatively thereto; said cylindrical bearing portion of the master-rod and the bearings of the auxiliary rods each being provided with passages for the conduction of a lubricant from said crankpin to all of said bearings; the passages of the auxiliary rods bearings being spaced from and relatively movable to those of the master-rod, and means disposed between and adapted to maintain an effective communication between the relatively movable passages.

3. In apparatus of the class described, the combination with a crankshaft having a crankpin provided with passages therethrough for the circulation of a lubricant to its outer circumference, of a master-rod having a cylindrical bearing element surrounding the crankpin, a plurality of auxiliary rods articulated to said master-rod by means of bearing elements and adapted for oscillation relatively thereto; said bearing elements being provided with fluid conducting passages extending from the outer circumference of the crankpin to the bearings surfaces of the auxiliary rods, and means disposed between the relatively moving parts to provide an effective seal between said passages during operation.

4. In apparatus of the class described, the combination with a crankshaft having a crankpin provided with passages therethrough for the circulation of a lubricant to its outer circumference, of a master-rod having a cylindrical bearing portion surrounding the crankpin, a plurality of auxiliary rods articulated to said master rod by means of bearings and adapted for oscillation relatively thereto, the bearing portion of the master-rod and the bearings of the auxiliary rods being spaced apart, a sealing element disposed between the spaced apart bearings in a manner as to contact therewith; all of said bearings and seal element being provided with passages adapted to convey a fluid from the outer circumference of the crankpin to the bearing surfaces of the auxiliary rods.

Signed at Keyport, in the county of Monmouth, and State of New Jersey this 20th day of January, 1931.

JOSEPH J. BOLAND.